(12) United States Patent
Fukasaku et al.

(10) Patent No.: US 6,965,173 B2
(45) Date of Patent: Nov. 15, 2005

(54) ELECTRIC GENERATING SYSTEM FOR AUTOMOBILES AND ITS CONTROL METHOD

(75) Inventors: Yoshinori Fukasaku, Hitachinaka (JP); Tatsuyuki Yamamoto, Hitachinaka (JP); Yuuji Maeda, Hitachiota (JP); Keiichi Mashino, Hitachinaka (JP); Susumu Tajima, Hitachinaka (JP); Hisaya Shimizu, Hitachinaka (JP); Keisuke Nishidate, Hitachinaka (JP); Toshiyuki Innami, Tsuchiura (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/793,424

(22) Filed: Feb. 27, 2001

(65) Prior Publication Data

US 2001/0019210 A1 Sep. 6, 2001

(30) Foreign Application Priority Data

Mar. 1, 2000 (JP) .......................................... 2000-055371
Jan. 19, 2001 (JP) .......................................... 2001-010979

(51) Int. Cl.$^7$ ............................ B60K 6/00; F02N 11/06; H02P 9/04
(52) U.S. Cl. ................................... 290/40 C; 180/65.2
(58) Field of Search ..................... 180/65.1, 65.2–65.7; 290/401, 40 R, 40 B, 40 A

(56) References Cited

U.S. PATENT DOCUMENTS

| | | | | |
|---|---|---|---|---|
| 4,319,140 A | * | 3/1982 | Paschke ...................... | 290/4 C |
| 4,629,947 A | * | 12/1986 | Hammerslag et al. ........ | 310/74 |
| 4,653,601 A | * | 3/1987 | Nakamura et al. ........... | 180/446 |
| 4,753,078 A | * | 6/1988 | Gardner, Jr. ................. | 180/305 |
| 4,951,769 A | * | 8/1990 | Kawamura .................. | 180/65.4 |
| 4,953,646 A | | 9/1990 | Kim | |
| 5,097,165 A | * | 3/1992 | Mashino et al. ............ | 310/112 |
| 5,332,954 A | | 7/1994 | Lankin | |
| 5,384,521 A | * | 1/1995 | Coe ............................ | 290/45 |
| 5,568,023 A | * | 10/1996 | Grayer et al. ............... | 318/139 |
| 5,635,805 A | | 6/1997 | Ibaraki et al. .............. | 318/139 |
| 5,650,713 A | * | 7/1997 | Takeuchi et al. ........... | 180/65.3 |
| 5,689,174 A | | 11/1997 | Pacheco, Sr. | |
| 5,698,905 A | * | 12/1997 | Ruthlein et al. ........... | 180/65.4 |
| 5,786,640 A | * | 7/1998 | Sakai et al. ................ | 180/65.2 |
| 6,020,697 A | | 2/2000 | Shimasaki et al. | |
| 6,054,844 A | * | 4/2000 | Frank ........................ | 180/65.2 |
| 6,190,283 B1 | * | 2/2001 | Uchida ......................... | 477/5 |
| 6,326,702 B1 | * | 12/2001 | Yonekura et al. ......... | 290/40 C |
| 6,394,210 B2 | * | 5/2002 | Matsuda et al. ........... | 180/65.1 |

FOREIGN PATENT DOCUMENTS

| | | |
|---|---|---|
| EP | 0122310 | 10/1984 |
| FR | 2667738 | 4/1992 |
| JP | 55061293 | 5/1980 |
| JP | 04197065 | 7/1992 |
| JP | 5131858 | * 5/1993 |
| JP | 05219767 | 8/1993 |
| JP | 08-079915 | 3/1996 |
| JP | 10-174201 | 6/1998 |
| JP | 11-240351 | 9/1999 |
| JP | 11285291 | 10/1999 |
| JP | 11332019 | 11/1999 |
| WO | 93/23263 | 11/1993 |

OTHER PUBLICATIONS

Search Report.

* cited by examiner

Primary Examiner—Nicholas Ponomarenko
Assistant Examiner—Julio Gonzalez Ramirez
(74) Attorney, Agent, or Firm—Crowell & Moring LLP

(57) ABSTRACT

The present invention provides a vehicle driving apparatus capable of being mounted easily even in a narrow space such as under-floor of the vehicle. The vehicle driving apparatus comprises a first and a second generators driven by an engine for driving front wheels, and a motor driven by receiving a power supply from the second generator to drive rear wheels, the first and second generators being installed in the vicinity of an engine within an engine room, the motor being arranged in the vicinity of a differential gear with which a reduction mechanism is integrated and is positioned substantially in a central part of the rear wheels.

6 Claims, 14 Drawing Sheets

GROUND DIRECTION

ELECTRIC GENERATING SYSTEM FOR AUTOMOBILES AND ITS CONTROL METHOD

BACKGROUND OF THE INVENTION

The present invention relates to a vehicle driving apparatus. Conventional vehicle driving apparatuses so far known are described, for example, in Japanese Patent Application Laid-Open Nos. Hei 5-131858 and Hei 11-332019. Out of these two Publications, the former Publication discloses a hybrid vehicle in which front wheels are driven by the engine, and rear wheels are driven by an electric motor with a reduction gear, wherein at the start of the vehicle, a start acceleration according to the road surface condition is obtained, and the motor is controlled so as to able to obtain the start acceleration to enhance the start performance.

The latter Publication discloses a 4-wheel drive vehicle in which a prime mover is connected to a first driving shaft through an electric motor, and an electric motor is provided on a second driving shaft, wherein the electric motor for the first driving shaft is driven by the prime mover to generate electricity, and the electric motor for the second driving shaft is driven by power obtained by the generation, or generation is carried out by the electric motor for the second driving shaft, and the electric motor for the first driving shaft is driven by power obtained by the generation.

However, in the former using the electric motor with a reduction gear, since the constitution of the vehicle driving apparatus becomes complicated and becomes large in size, consideration is not taken into the improvement in mounting properties of the vehicle driving apparatus under the floor of the vehicle in a narrow space, and in the latter, since an inverter for driving and controlling the electric motor and an inverter for generating and controlling the electric motor are necessary, consideration is not taken into the enhancement of economization of the vehicle driving apparatus.

SUMMARY OF THE INVENTION

It is a main object of the present invention to provide a vehicle driving apparatus capable of being mounted easily even in a narrow space such as an area under the floor. It Is a further typical object of the present invention to provide a vehicle driving apparatus capable of constituting a 4-wheel drive vehicle using an electric motor without using expensive parts such as an inverter.

The fundamental characteristics of the present invention lies in that a first and a second generators driven by the internal combustion engine for driving one of front and rear wheel of a vehicle are installed in the vicinity of the internal combustion engine in a chamber in which the internal combustion engine is received, a so-called engine room, and an electric motor for driving the other of the front and rear wheels is arranged in the vicinity of a gear mechanism provided on the other axle of the front and rear wheels and with which a reduction mechanism is integrated. With this constitution, even in a narrow space such as a location under the floor of a vehicle, mounting of the vehicle driving apparatus is facilitated.

The gear mechanism is a differential gear located substantially in the central portion of the rear wheels. A first generator is provided to generate power for charging a battery as storage means or power for driving loads loaded on the vehicle, and is electrically connected to the charging power or the loads loaded. A second generator is provided to generate driving-power of an electric motor, and is electrically connected by a two-wire type wiring path.

The electric motor used may be either a DC motor or an AC motor. The second generator is of a closed type for circulating a cooling medium within the generator to cool it, and is arranged at a position below the first generator. The first generator is of an open type for taking open air as a cooling medium into the generator to cool it, and is arranged at a position above the second generator.

The vehicle driving apparatus is provided with control means for controlling the electric motor and the second generator. The control means is provided in a wiring path of the battery and the second generator and mounted in a vacant space in the engine room. Or, the control means is provided internally of an ABS control unit or an engine control unit.

The other fundamental characteristics lies in that an electric motor for driving a second axle of a vehicle comprises an induction motor having an armature winding of the same number of phases as that of an armature winding of a generator driven by a prime mover for driving a first axle of a vehicle, the armature winding of the generator and the armature winding of the induction motor are electrically connected, and a current flowing into a field winding of the generator is controlled to vary a voltage applied to the induction motor to control torque generated in the induction motor. With this constitution, there can be realized a 4-wheel drive vehicle using an electric motor without using expensive parts such as an inverter.

The vehicle driving apparatus is provided with a polarity switching device for switching the direction of a current flowing into the field winding of the generator. The induction motor can be rotated in any of normal and reverse directions by using the polarity switching device. The vehicle driving apparatus is provided with a rectifier for converting an AC output of an armature winding of a generator into a DC. A DC output of the rectifier can be used as a power supply of a field winding of a generator by using the polarity switching device.

DESCRIPTION OF THE PREFERRED EMBODIMENTS (First Embodiment)

Figure 1:
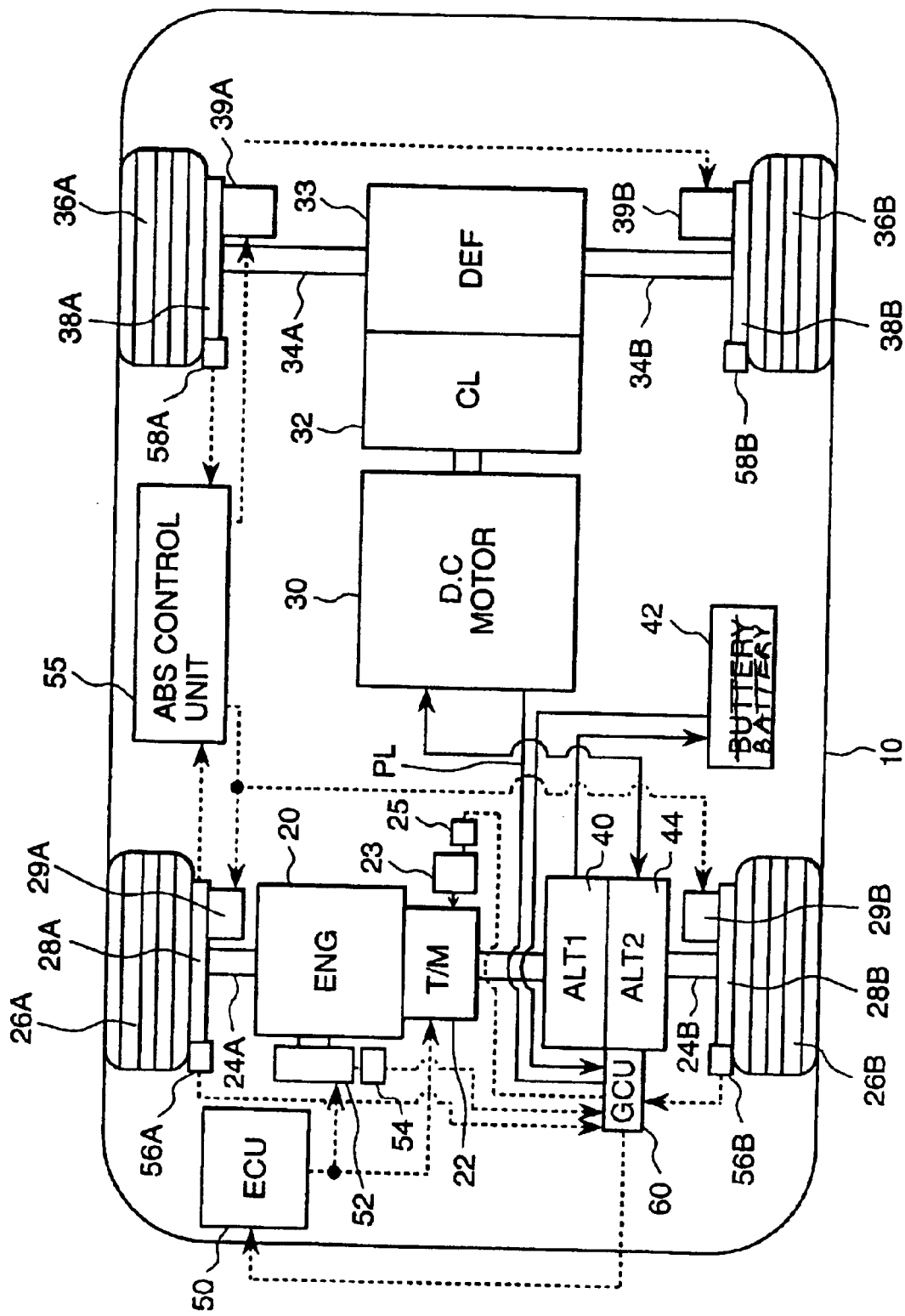
FIG. 1 is a system constitutional view showing the whole constitution of a 4-wheel drive vehicle using a vehicle driving apparatus according to a first embodiment of the present invention.

A first embodiment of the present invention will be described hereinafter with reference to FIGS. 1 to 9. FIG. 1 shows the whole constitution of a 4-wheel drive vehicle. On a 4-wheel drive vehicle 10 are loaded an engine 20 as a driving device and a DC motor 30. The driving force of the engine 20 is transmitted to front wheels 26A and 26B through a transmission 22 and first axles 24A and 24B. Thereby, the font wheels 26A and 26B are driven. The DC motor 30 is connected to rear wheels 36A and 36B through a clutch 32, a differential gear 33 and second axles 34A and 34B. When the DC motor 30 and the differential gear 33 are connected to each other by the clutch 32, the driving force of the DC motor 30 is transmitted to the rear wheels 36A and 36B through the clutch 32, the differential gear 33 and the rear wheels (second axles) 34A and 34B. Thereby, the rear wheels 36A and 36B are driven. When the DC motor 30 and the differential gear 33 are separated from each other by the clutch 32, the DC motor 30 is separated from the rear wheels 36A and 36B mechanically. Thereby the driving force of the DC motor 30 is not transmitted to the rear wheels 36A and 36B.

It is desirable that the dimensions of the outside diameter of the DC motor 30 be equal to or smaller than those of the differential gear 33, and be set to 200 mm or less in the present embodiment. The differential gear 33 used is provided with a reduction mechanism integrally. The DC motor used comprises, for example, a DC shunt motor capable of easily carrying out switching between forward and reverse modes or a separately excited DC motor.

While in the foregoing, a description is made of a case where the vehicle driving apparatus of the present embodiment is applied to the 4-wheel drive vehicle in which the front wheels 26A and 26B are driven by the engine 20, and the rear wheels 36A and 36B are driven by the DC motor 30, it is to be noted that the present embodiment may be applied to the 4-wheel drive vehicle in which the front wheels are driven by the DC motor and the rear wheels are driven by the engine. The vehicle driving apparatus of the present embodiment can be also applied to a tractive vehicle such as a vehicle having six wheels or more like a truck or to a tractive vehicle like a trailer.

Within the engine room are arranged a generator for ancillaries (ALT1) 40 constituting a normal charging and generating system and a battery for ancillaries 42. The generator for ancillaries 40 is belt-driven by the engine 20, and output of the generator for ancillaries 40 is stored in the battery for ancillaries 42. A driving high power generator (ALT2) 44 belt-driven by the engine 20 is disposed in the vicinity of the generator for ancillaries 40. The driving high power generator (ALT2) 44 is electrically directly connected to the DC motor 30 through a two-wire type wiring path PL. The DC motor 30 is driven by the output of the driving high power generator 44. The generator for ancillaries 40 used comprises, for example, a general generator of about 12V, 2 kW. A generator of about 36V, 6 kW that provides a higher output than that of the generator for ancillaries 40 is used, for example, as the driving high power generator 44.

Output of the engine 20 is controlled by an electronic control throttle valve 52 driven according to a command from an engine control unit (ECU) 50. The engine control unit 50 is provided with an accelerator opening-degree sensor 54 for detecting an accelerator opening-degree. Where an accelerator pedal and a throttle valve of a mechanical link are used in place of the electronic control throttle valve, the accelerator opening-degree sensor can be provided on the accelerator pedal. ECU 50 controls a transmission 22. The transmission 22 comprises an automatic transmission, which is automatically controlled so as to provide a gear ratio selected by a select lever 23. A position of the select lever 23 is detected by a gear position detection sensor 25. A manual transmission may be used for the transmission 22.

Brakes 28A, 28B and 38A and 38B provided on the front wheels 26A, 26B and the rear wheels 36A, 36B are provided with anti-lock brake (ABS) actuators 29A, 29B and 39A, 39B, respectively, controlled by an anti-lock brake (ABS) control unit 55. The wheels of the front wheels 26A, 26B and rear wheels 36A, 36B are provided with rotation sensors 56A, 56B and 58A, 58B for detecting rotational speed and rotational direction. The ABS control unit 55 calculates the frictional coefficient $\mu$ of the road surface on the basis of the outputs of the rotation sensors 56A, 56B and 58A, 58B to operate the actuators 29A, 29B and 39A, 39B so that the braking force according to the value of the frictional coefficient $\mu$ may be applied to the brakes 28A, 28B and 38A and 38B. While the rotation sensors 56A, 56B and 58A, 58B are provided every wheel, it is to be noted that they may be provided one of or both the front wheel axle and rear wheel axle.

An output voltage control circuit for a driving generator (GCU) 60 calculates the vehicle speed on the basis of the rotational speeds of the wheels 26A, 26B and 36A, 36B detected by the rotation sensors 56A, 56B and 58A, 58B to control the driving high power generator 44 and the DC motor 30 based on the calculated speed. GCU 60 control a field current supplied to a field winding of the DC motor 30. The detail of the control by GCU 60 will be described later with reference to FIG. 3.

Figure 2:
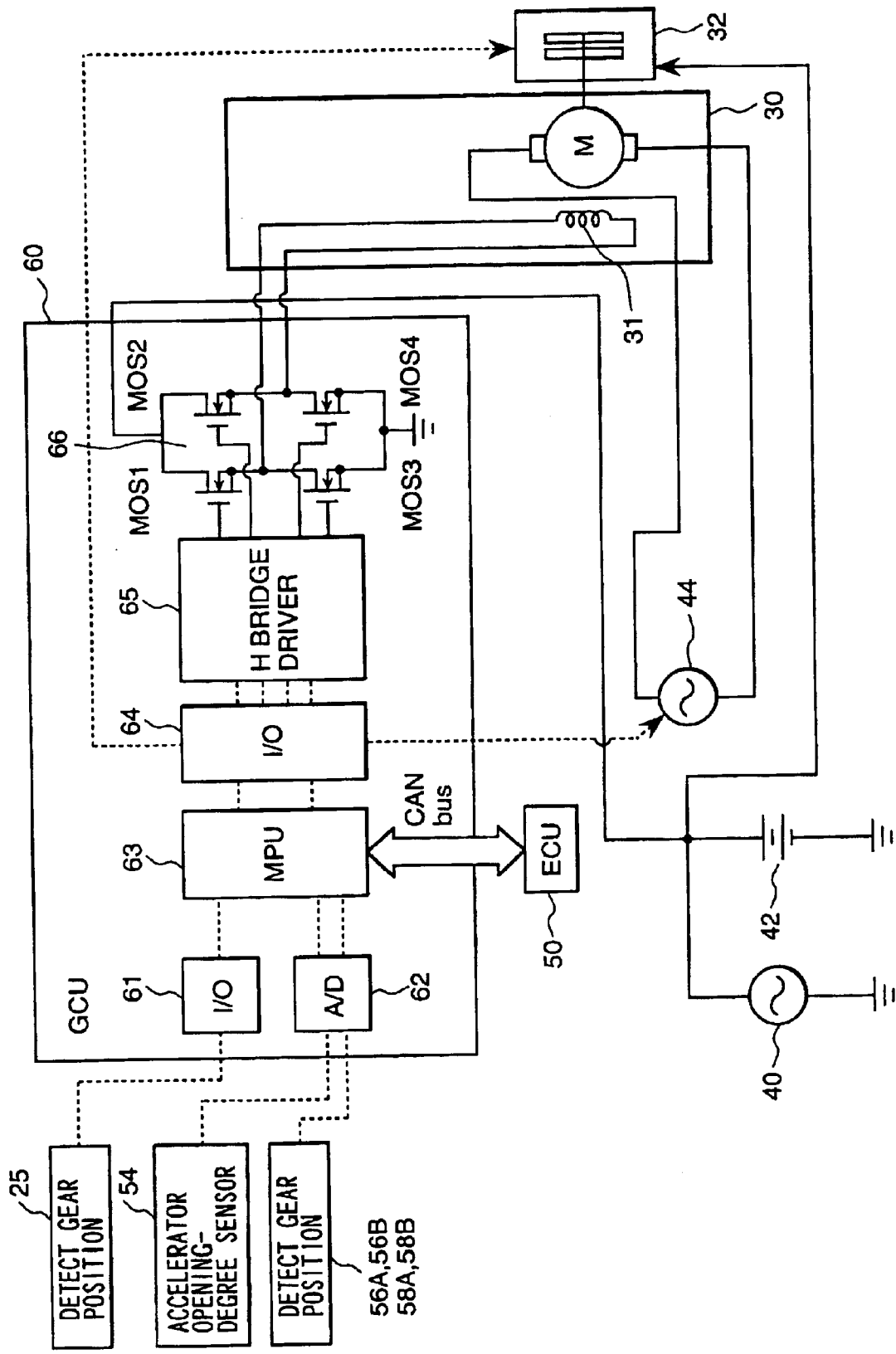
FIG. 2 is a block diagram showing the constitution of the vehicle driving apparatus according to a first embodiment of the present invention.

FIG. 2 shows the circuit constitution of power supply and control relation for the vehicle driving apparatus. The same parts as those of FIG. 1 are indicated by the same reference numerals. In the connection between the blocks in the figure, the solid line indicates the connection of the power supply, and the broken line indicates the connection of the control relation. Input into the driving generator output voltage control circuit (GCU) 60 are information on the rotational speed and the rotational direction of the wheels 26A, 26B and 36A, 36B detected by the rotation sensors 56A, 56B and 58A, 58B, information on the accelerator opening-degree detected by the accelerator opening-degree sensor 54, and information on the gear position detected by the gear position detection sensor 25. GCU 60 outputs a command value of output voltage to the driving high power generator (ALT2) 44 on the basis of the obtained information to control the output voltage of the high power generator 44. Thereby, the DC motor 30 is controlled. Further, the GCU 60 controls the field current flowing into the field winding 31 of the DC motor 30 to directly control the DC motor 30. This improves the lowering of the response caused by controlling the DC motor 30 by the output of the high power generator 44.

The driving generator output voltage control circuit (GCU) 60 comprises an I/O circuit 61, an A/D converter 62, a micro processor (MPU)63, an I/O circuit 64, a H bridge driver 65, and a H bridge circuit 66. Gear position information detected by the gear position detection sensor 25 is fetched into MPU 63 through the I/O circuit 61. Information on the rotational speed and the rotational direction of the wheels 26A, 26B and 36A, 36B detected by the rotation sensors 56A, 56B and 58A, 58B, and information on the accelerator opening-degree detected by the accelerator opening-degree sensor 54 are fetched into MPU 63 through the A/D converter 62. The MPU 63 is provided with CPU and a memory for holding programs and data to control the motor, calculates vehicle speeds and output voltage value of the driving high-power generator 44 in accordance with the input information, calculates to supply it from the I/O circuit 64 to the driving high-power generator (ALT2) 44, to control the output voltage value generated by the driving high-power generator 44.

An input circuit to the separately excited DC motor 30 is constituted by a parallel circuit of an armature winding circuit and a field winding circuit. An input circuit for an armature winding is constituted by directly connecting the generator 44 and the armature winding of the DC motor 30 through a two-phase type wiring path PL. Thereby, power ranging from low voltage to high voltage proportional to the engine speed is directly supplied, with optimum efficiency, from the generator 44 to the armature winding of the motor 30 through the wiring path PL. In the present embodiment, the voltage value is set to 50V or less in consideration of an electric leakage of high voltage and the heat resistance of the generator 44.

An input circuit for a field winding is constituted by connecting a H bridge circuit 66 constituted from MOS1 to MOS4 to a field winding 31 of the DC motor 30 through a signal line 31. Thereby, power of 12V is supplied to the field winding 31 of the motor 30 through the H bridge circuit 66 from a 12V battery 42. At this time, MPU 63 regulates a field current to flow into the field winding 31 of the DC motor 30 in the H bridge circuit 66 through the I/O circuit 64 and the H bridge driver 65 so that the characteristics of the DC motor 30 fits to a demanded value. When the vehicle moves back, a field current causes to flow from the H bridge circuit 66 in the direction reversed to the forward direction to thereby obtain the reverse driving force similar to the advance of the vehicle. The MPU 63 produce connection and disconnection signals for the clutch 32 to feed it from the I/O circuit 64 to the clutch 32.

As described above, the parallel circuit is employed and the diameter and the number of windings of the armature winding and the field winding are varied whereby an input current to the armature winding and an input current to the field winding can be set to be large and small, respectively. It is set for example that the armature current be about 250 A at a maximum and the field current be about 20 A at a maximum or less.

While in the foregoing, the sensor signals are input directly into the driving generator output voltage control circuit 60, sensor outputs may be input from other control units (for example, ECP 50 and ABS control unit 55) loaded via the in-vehicle LAN (CAN) bus.

The battery for ancillaries 42 is a 12 V battery, which constitutes a normal charge-discharge system between various electric loads for a 12 power source and the generator for ancillaries 40. In the present embodiment, the generator for ancillaries 40 and the battery for ancillaries 42 are used as the power supply of the DC motor 30 and the field side power supply of the driving high power generator 44. The provision of two systems of the power supply systems as described enables two ways of controls, i.e., a method for controlling a field current of the driving high power generator 44 and a method for controlling a field current of the DC motor 30. For example, when the necessary rotational frequency of the motor at the start of the vehicle is low and the necessary torque is high, the output current value of the driving high power generator 44 is set to a larger value whereby the motor assumes the output of low rotation and high torque. Further, when, at the running of the vehicle, the necessary rotational frequency of the motor is high and the necessary torque is low, the output voltage value of the driving high power generator 44 is set to a larger value to thereby cope with the situation. By lowering the field current of the DC motor 30, the rotational frequency of the motor can be increased while improving the responsiveness when the vehicle runs. When the front wheel 26 is higher in the torque distribution demanded value than the rear wheel, the field current value of the driving high power generator 44 can be adjusted to make the torque distribution for the front wheel 26 and the rear wheel 36 variable.

The power supply line of the clutch 32 is connected to the battery for ancillaries 42, and the connection and disconnection of the clutch 32 are controlled by MPU 63, thus not depending on the generative force of the driving high power generator 44 whose generative force always changes. Accordingly, when the 4-wheel drive function is not necessary, the mechanical connection between the rear wheels 36A and 36B and the DC motor 30 can be forcibly disengaged. For example, when the vehicle speed is 20 km/h, the clutch 32 is turned off to provide the drive system of the front wheels alone, whereby the abrasive amount of the brush of the DC motor 30 can be reduced as compared with the system operated in the whole vehicle speed regions. Further, since the DC motor 30 is not used in the condition that the clutch 32 is disengaged, the driving high power generator 44 can be switched by a switch for use as a power supply for the charging device and other ancillaries.

The motor 30 is utilized as a generator at the time of high speed running or running at downhills, and equipment for charging or consuming generation caused by the motor 30 is provided within the vehicle to obtain the braking forces such as the regenerative braking and the generative braking.

In the present embodiment, since the field current is set to a small value, say 20A, the middle of the field current supply system, namely, the power line, can be formed within the same substrate as the signal control unit 60 including the micro processor 63. Naturally, the signal line that moves in and out of the microprocessor 63 can be also formed within the same substrate as the signal control unit 60. That is, a control device having driving means for controlling a driving motor and an exclusive-use generator is able to employ a smaller current independently of other machineries, and therefore, in case of a wiring path between the normal 12V battery 42 and the input side of the exclusive-use generator 44, the control device can be mounted as a single unit in a vacant space within the engine room, and can be also housed to common or independently in the substrate for an engine control unit for controlling the engine by a microcomputer or for an ABS control unit for controlling the braking force.

Figure 3:
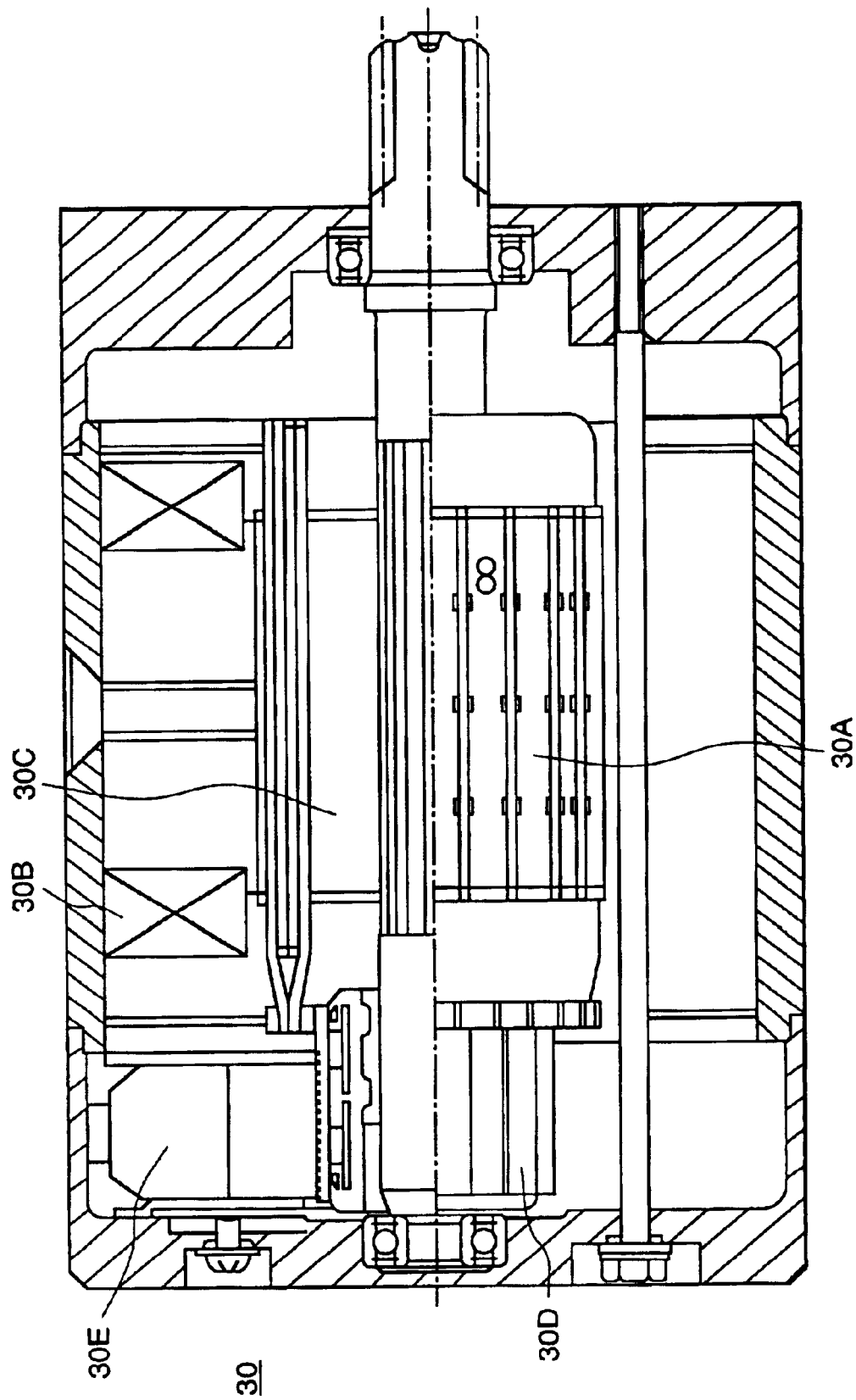
FIG. 3 is a longitudinal sectional view showing the constitution of an electric motor used in the vehicle driving apparatus according to the first embodiment of the present invention.
Figure 4:
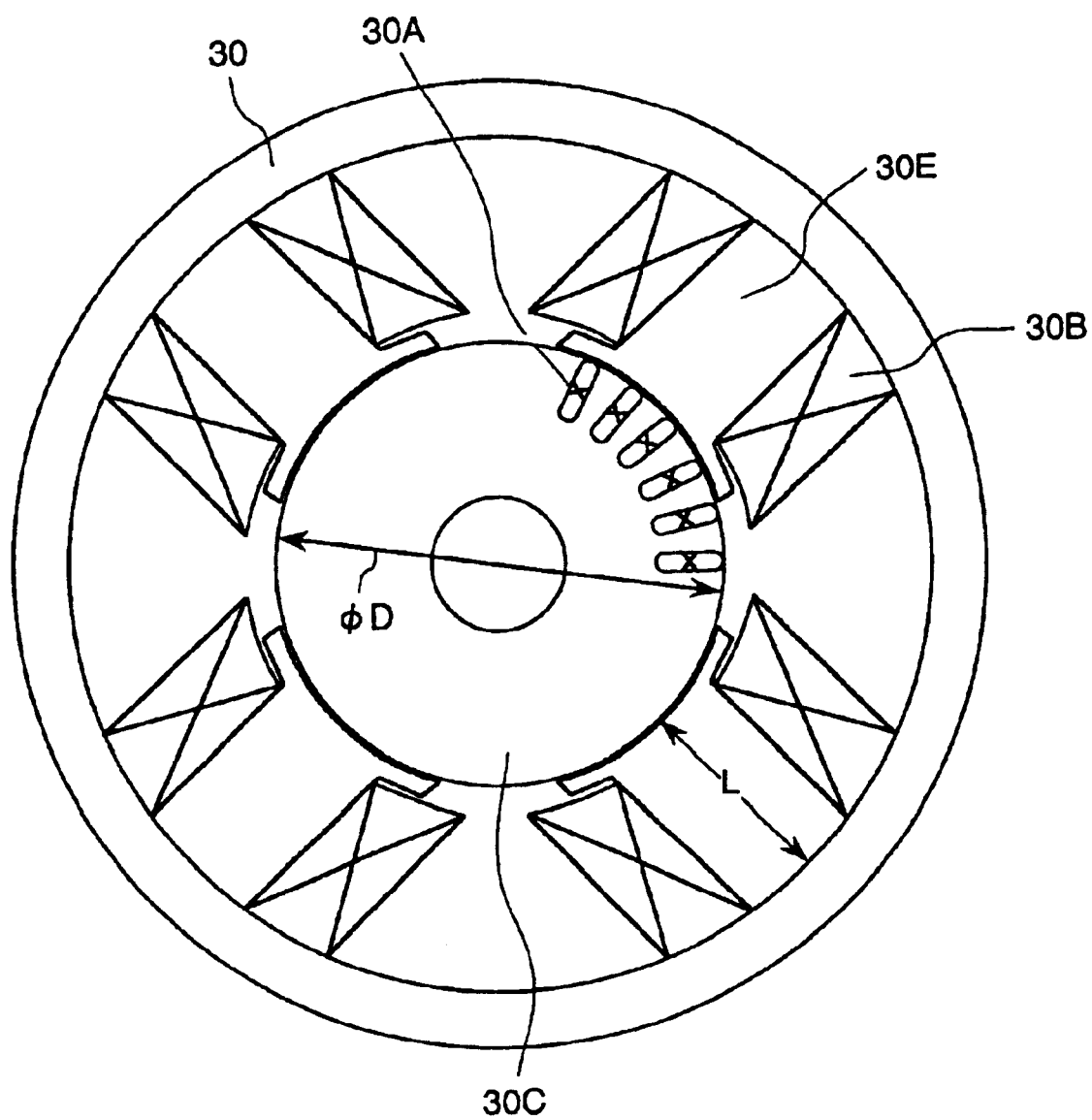
FIG. 4 is a cross sectional view of FIG. 3.

FIGS. 3 and 4 show the constitution of the motor of the vehicle driving apparatus. The motor 30 is a DC shunt motor. Power of 50V or less generated by the generator 44 is supplied to an armature winding 30A. Power of 12V is supplied to a field winding 30B. As described, in the present embodiment, an input current to the armature winding is set to be high, and an input current to the field winding is set to be low. Since power of relative high voltage and high current is supplied to the armature winding 30A, the number of windings can be reduced. Thereby, an armature core 30C can be miniaturized, that is, can be reduced in radius. Since power of relative low voltage and low current is supplied to the field winding 30B, the number of windings can be increased.

In the present embodiment, power of different magnitude is supplied from two power supplies to the armature winding 30A and the field winding 30B, and the relationship when ½D be the radius of the armature core 30C of the shunt motor 30 and L be the thickness in a radial direction of the field winding 30B is determined, though L<½D in a normal motor, such that L is as long as possible, and the value of L is a value close to ½D.

Because of this, the radius of the armature core 30C becomes small, and the radius of a rectifier 30D also becomes small, so that the radial length of a brush 30E can be sufficiently lengthened, and the life of the brush 30E can be prolonged. In consideration of the mounting space under the floor of the vehicle, the dimensions of the outside diameter of a portion in which the brush 30E of the motor 30 is housed is made to have the dimensions corresponding to the outside diameter of the differential gear 33 at a maximum to thereby make the length of the brush 30E sufficiently long.

As described above, power of different magnitude is supplied from two power supplies to the armature winding 30A and the field winding 30B, and thereby the dimensions of the outer diameter of the motor 30 is made to be equal to or less than that of the differential gear 33, for example, 200 mm or less while securing the length of the brush at a maximum within the relation of L<½D as described above.

Figure 5:
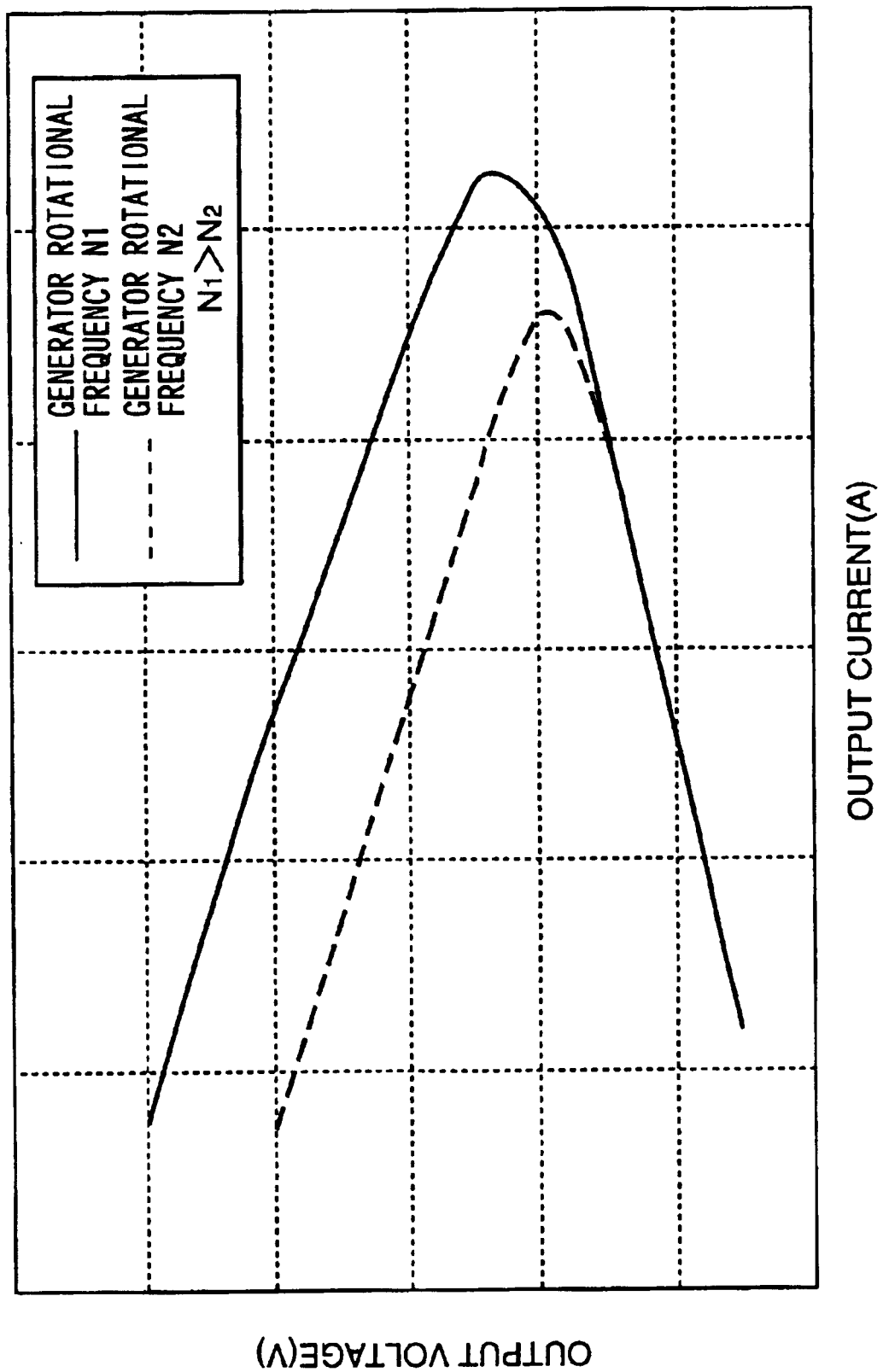
FIG. 5 shows output characteristics of a generator used in the vehicle driving apparatus according to the first embodiment of the present invention.

FIG. 5 shows the output characteristics of the generator of the vehicle driving apparatus. The present characteristics are output characteristics of the generator 44, in other words, input characteristics of the motor 30. It is understood from the characteristics that the output range of the generator is enlarged in the form of a parabola along with a terminal voltage and current in proportional to the engine speed. That is, in the conventional charge/start system, since an exclusive-use generator is not provided, only the control in a fixed region connected once to the load through the 12V battery and limited irrespective of the engine speed and the generation efficiency of the generator is selected for the terminal voltage and the output current, and the input of the driving motor is merely applied within the thus limited range. On the other hand, in the present embodiment, the control of the driving motor within the parabola shown in FIG. 5 becomes possible to enable provision of control capable of freely selecting the running mode that should be furnished as the 4-wheel drive vehicle.

According to the present invention described above, the motor 30 is controlled independently from the engine 20. That is, the clutch 32 is turned on, during the forward and the reveres running limited in the range less than the fixed value (for example, 20 Km/h) from the start of the vehicle (the vehicle speed is zero), to drive the rear wheels of the vehicle. When the vehicle speed exceeds 20 Km/h, the clutch 32 is turned off and the vehicle runs merely by the engine 20. As compared with that the rear wheels of the vehicle are driven through the propeller shaft from the engine, a speed-change mechanism and a propeller shaft derived from the engine are not necessary so that the 4-wheel drive mechanism is miniaturized and light-weighted, and at the same time, since the rear wheel side is separated, in excess of a fixed value, from the front wheel side, thus also contributing to improvement in fuel consumption. Further, since the start assistance is obtained at the time of start, that is, from the condition that the vehicle speed is zero, the start accelerating properties are excellent.

Further, according to the present embodiment, power of different magnitude is supplied from two power supplies to the armature winding 30A and the field winding 30B of the motor 30 to make the dimensions of the outer diameter of the motor 30 equal to or less than that of the differential gear 33 while securing the length of the brush within the relationship of L<½D described above, whereby the space necessary for mounting under the floor of the vehicle can be reduced.

Furthermore, according to the present embodiment, the input circuit to the shunt motor 30 is constituted by the parallel circuit for the armature winding and for the field winding, and power are supplied from power supplies of different voltages to the armature winding 30A and the field winding 30B whereby the field current can be set to a small value of about 20A. Therefore, the middle of the supply system of the field current, that is, the signal line SL can be formed in the same substrate as the signal control unit 60 including the microprocessor 63. Naturally, the signal line that moves in and out of the microprocessor 63 can be also formed in the same substrate as the signal control unit 60. Further, since the field current is low, the field current supply system of the motor 30 and the control circuit thereof can be formed in the same substrate as the ABS control unit 55. The field current supply system of the motor 30 and the control circuit thereof may be formed in the same substrate as the engine control unit 50. Alternatively, they may be formed in the same substrate as the ABS control unit 55 and the engine control unit 50. Thereby, the supply system of the field current of the shunt motor 30 and the control circuit thereof can be reduced in price.

On the other hand, It is of course possible that a device having driving means for controlling both the generator 44 and the motor 30 housed therein is made to be independent and is mounted in a vacant space in the engine room in the wiring path between the battery and the input side of the second generator. Mounting to the existing control system can be made, and generality is very wide.

Figure 6:
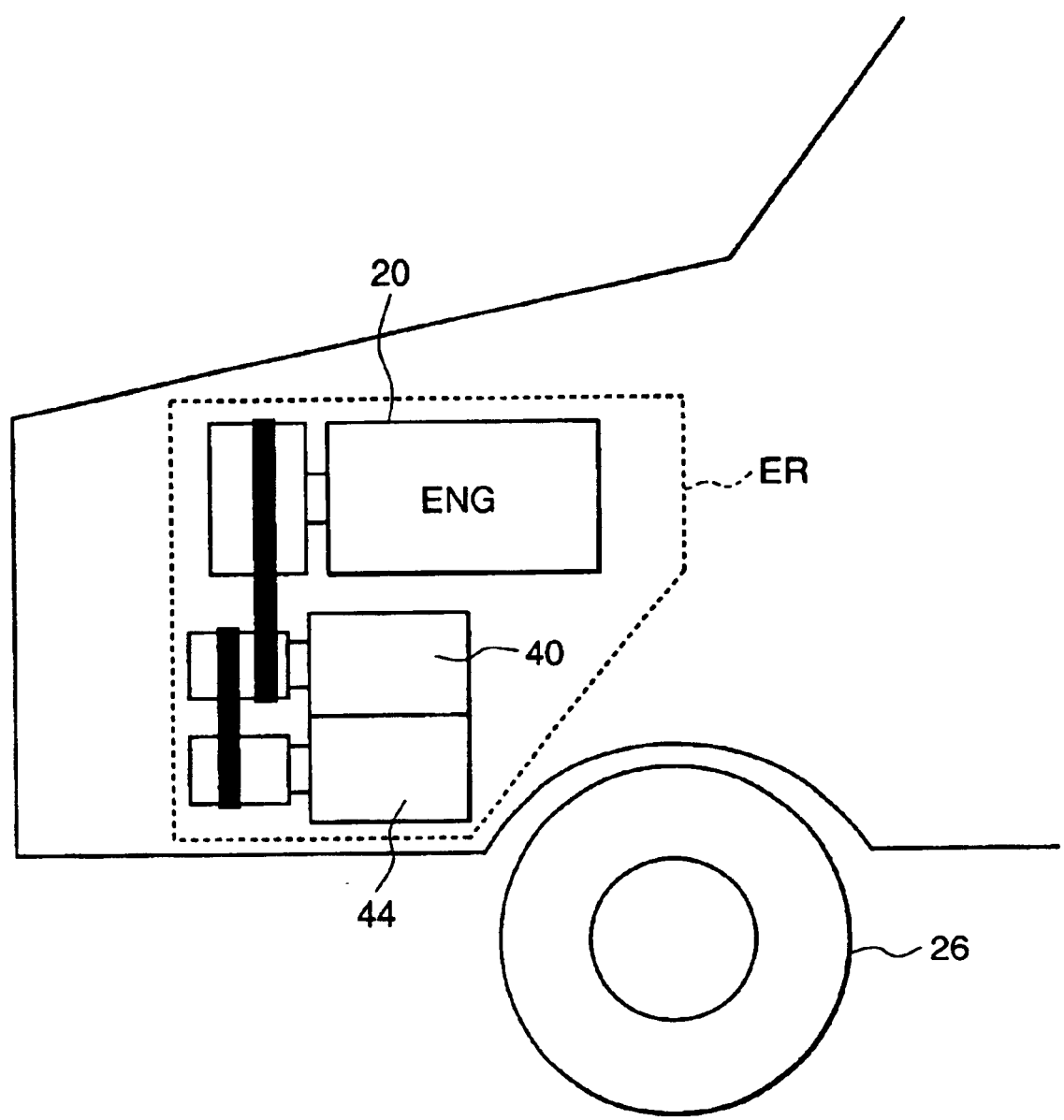
FIG. 6 is a side view showing mounting state of two generators used in the vehicle driving apparatus according to the first embodiment of the present invention.
Figure 7:
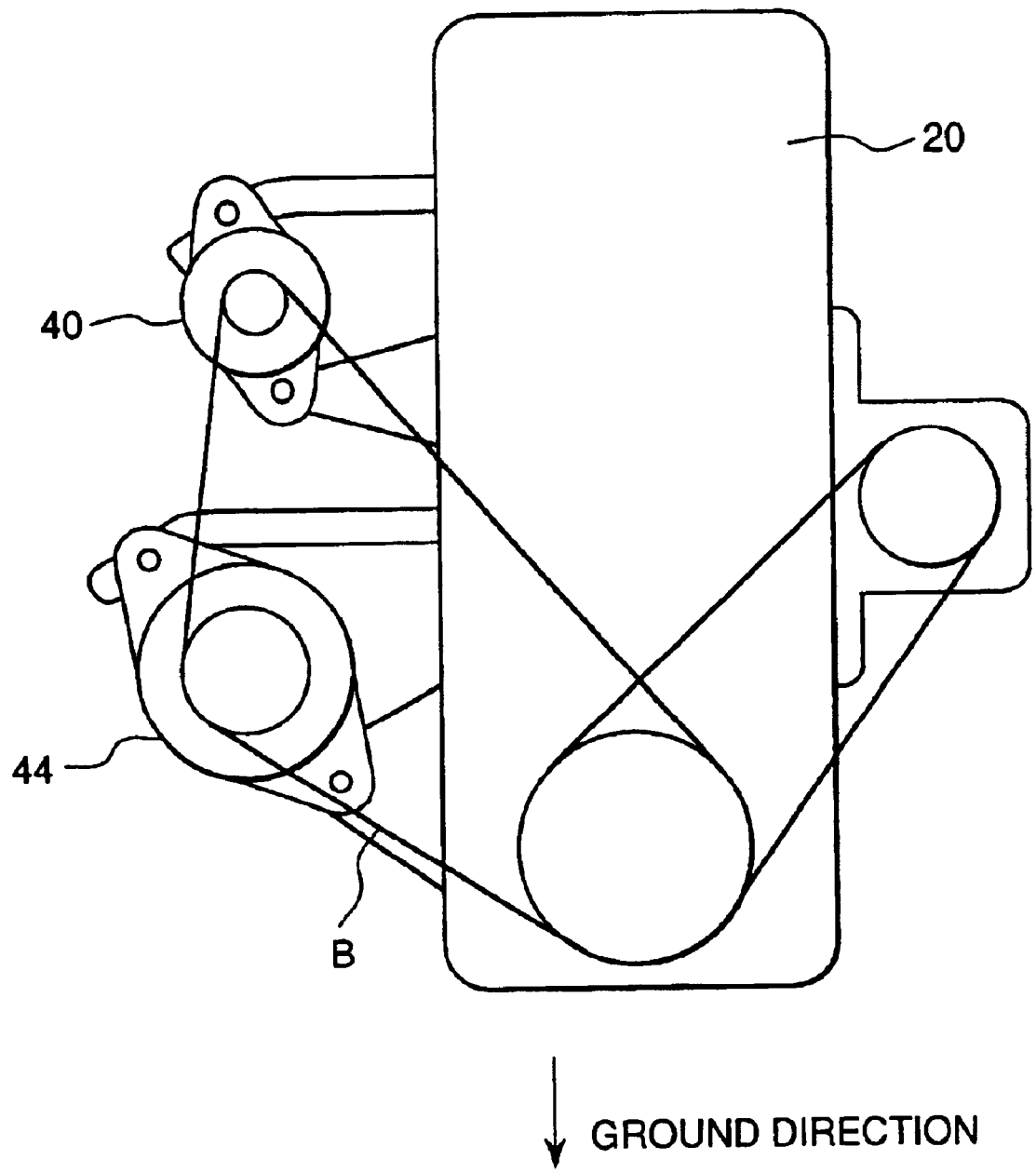
FIG. 7 is a side view showing mounting state of two generators used in the vehicle driving apparatus according to the first embodiment of the present invention.

FIGS. 6 and 7 show the mounting state of two generators of the vehicle driving apparatus. FIG. 6 shows, in a vehicle having a power steering system loaded thereon used in improving steering properties of a vehicle, the mounting state as viewed from the vehicle side of the engine room ER of the vehicle for which an electric power steering system for rotating a driving shaft of a power steering by a motor without using hydraulic pressure is jointly used. The first generator 40 is connected and driven by the engine 20 and the belt A and positioned above the second generator 44, and the second generator 44 is positioned below the first generator 40 making use of the vicinity where a hydraulic system machine such as a hydraulic pump is installed conventionally. The second generator 44 is positioned at a lower part in the vicinity of the first generator 40 to likewise facilitate the belt-drive, and the engine 20, the first generator 40 and the second generator 44 are laid out in a zigzag manner to thereby further reduce an installation space in the engine room, increasing the mounting properties.

As shown in FIG. 7, the generators 40 and 44 loaded in the engine room 20 are driven through the belt B. While in the drawing, two generators 40 and 44 are driven by a single belt B, it is noted that separate power transmission devices such as belts may be used. The generator 40 is, at present, generally widely used as a vehicular generator. Open air is introduced by a cooling fan for cooling, and a bird cage-like ventilation window is provided. The generator 44 is arranged at a place closer to the ground with respect to the generator 40, e.g., at a place which is apt to suffer materials of impairing the function of the generator such as rust promoted when enter the generator substances such as sand and dust that tires flies up when the vehicle travels, water in rainy day, sodium chloride and calcium chloride scattered on the road for preventing the road from freezing in a winter season.

Figure 8:
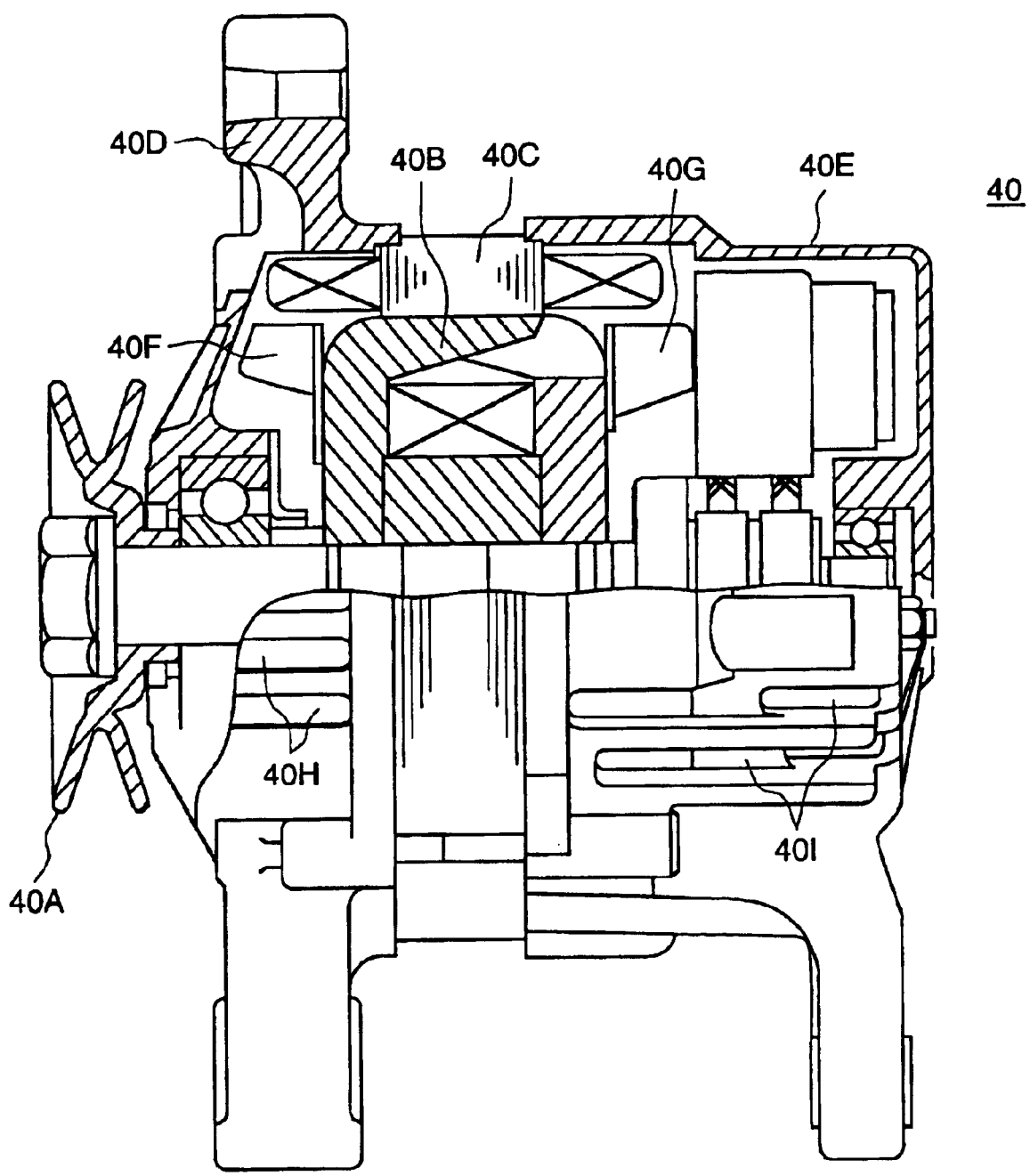
FIG. 8 is a longitudinal sectional view showing the constitution of a first generator used in the vehicle driving apparatus according to the first embodiment of the present invention.

FIG. 8 shows the constitution of the first generator of the vehicle driving apparatus. The generator 40 is, at present, loaded on the vehicle relatively generally. It has a cooling fan to introduce and discharge open air out of a bird cage-like ventilation window. The generator 40 is driven by receiving the rotating force from the engine, has a pulley 40A, a rotor 40B, and a stator 40C, and is constituted by brackets 40D and 40E used to be mounted on the engine, and cooling fans 40F and 40G. Ventilation windows 40H and 40I are arranged on the brackets 40D and 40E, so that open air is introduced and discharged from the cooling fans 40F and 40G so as to cool self-heat generation at the time of generation.

Where the generator 40 is arranged at a position relatively near the ground and at a position easily covered with water, water, sodium chloride and calcium chloride are apt to enter the generator to quicken progress of corrosion. Foreign matter such as mud is sometimes clogged in the ventilation windows 40H and 40I to materially lower the cooling performance. So, as shown in FIG. 7, the generator 40 is mounted at a relatively high position away from the ground.

Figure 9:
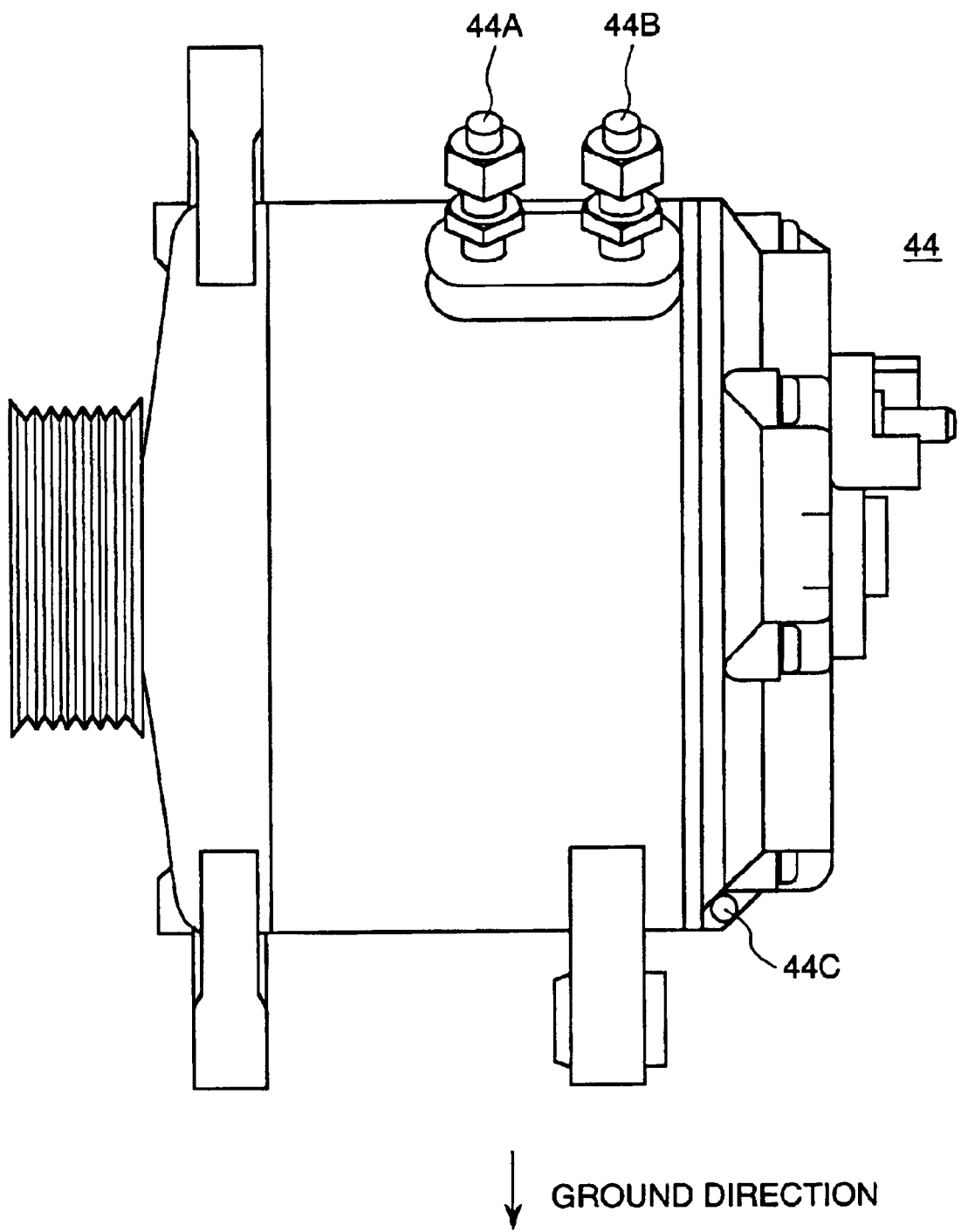
FIG. 9 is a side view showing the constitution of a second generator used in the vehicle driving apparatus according to the first embodiment of the present invention.

FIG. 9 shows the constitution of the second generator of the vehicle driving apparatus. The generator 44 has a construction suitable for being arranged at a position relatively near the ground. The generator 44 holds a rotor and a stator (not shown) of the generator by brackets without ventilation window, and is loaded on the engine. A cooling system is constituted such that a cooling medium for the engine is received from a cooling medium supply port 44A, and self-heat generation at the time of generation is cooled by circulating cooling water within the generator adequately, after which it is returned to the engine from a cooling medium discharge port 44B and is cooled by a radiator attached to the engine to be recirculated.

Where the generator 44 constituted as shown in FIG. 9 is arranged at a place relatively near the ground as shown in FIG. 7, it is not necessary for the cooling fan to intake and discharge open air from the ventilation window because no cooling fan and no ventilation window exit. Accordingly, material which incites rust and foreign matter which causes trouble are not taken in, and particularly, where the generator is covered with water during running of the vehicle, foreign matter such as water is scarcely introduced into the generator. Since the generator itself is cooled by the medium supplied from the engine side, the generation performance and the life are not affected by the adhesion of foreign matter to the bird cage-like ventilation window and the presence or absence of an anti-droplet cover, and in addition, the change in cooling performance caused by the change of environment less occurs, thus enabling obtaining the stabilized generation and the life.

The substantially closed generator 44 as described above is bored with a hole 44C for breath and draining to remove bedewing and water or the like sunk from a small clearance of a part in which parts are combined, which is, however, far small in area as compared with the constitution using a cooling fan and having a bird cage-like ventilation window. Therefore, submersion and an amount of entry of foreign matter into the generator are very small, thus posing no problem about the corrosion resistance and entry of foreign matter.

Further, because of the generator having the construction without any cooling fan, it is possible to remove wind rush of the cooling fan and interference noises of cooling air with parts constituting a generator, differently from the generator which requires a cooling fan. Therefore, it is possible to suppress noises from the generator feared when a plurality of generators are loaded.

According to the present embodiment described above, since two generators of different construction shown in the figure are mounted as described above, it is possible to easily mount and add a vehicular generator of high power and long life to the vehicle without worrying about the corrosion resistance. Further, with respect to the vehicle which employs an electric power steering to thereby abolish a conventional hydraulic pump for a hydraulic power steering driven by the engine by means of a belt or the like, a generator is arranged at a position in which the hydraulic pump is present or ancillaries driven by separate belt or the like are arranged at a position of the hydraulic pump, and a vehicular generator is arranged at a vacant position whereby the belt system need not be changed, and arrangement and shape of parts present around the engine are not affected. Therefore, the vehicular generator can be added easily and inexpensively. Particularly, for example, where a vehicular generator is added as a power supply for a vehicle driving motor, i.e., where a vehicular generator having a larger generation capacity than that of the conventional vehicular generator is added, it is essential to have a vehicular generator for circulating an engine cooling medium to cool self-heat generation of the vehicular generator in order to minimize a vehicular generator having a large generation capacity. Therefore, the method of loading the vehicular generator according to the present embodiment is rational and effective. Furthermore, as compared with the case where a plurality of generators having a cooling fan are loaded, it is possible to materially lower the noises generated by the generator.

(Second Embodiment)

Figure 10:
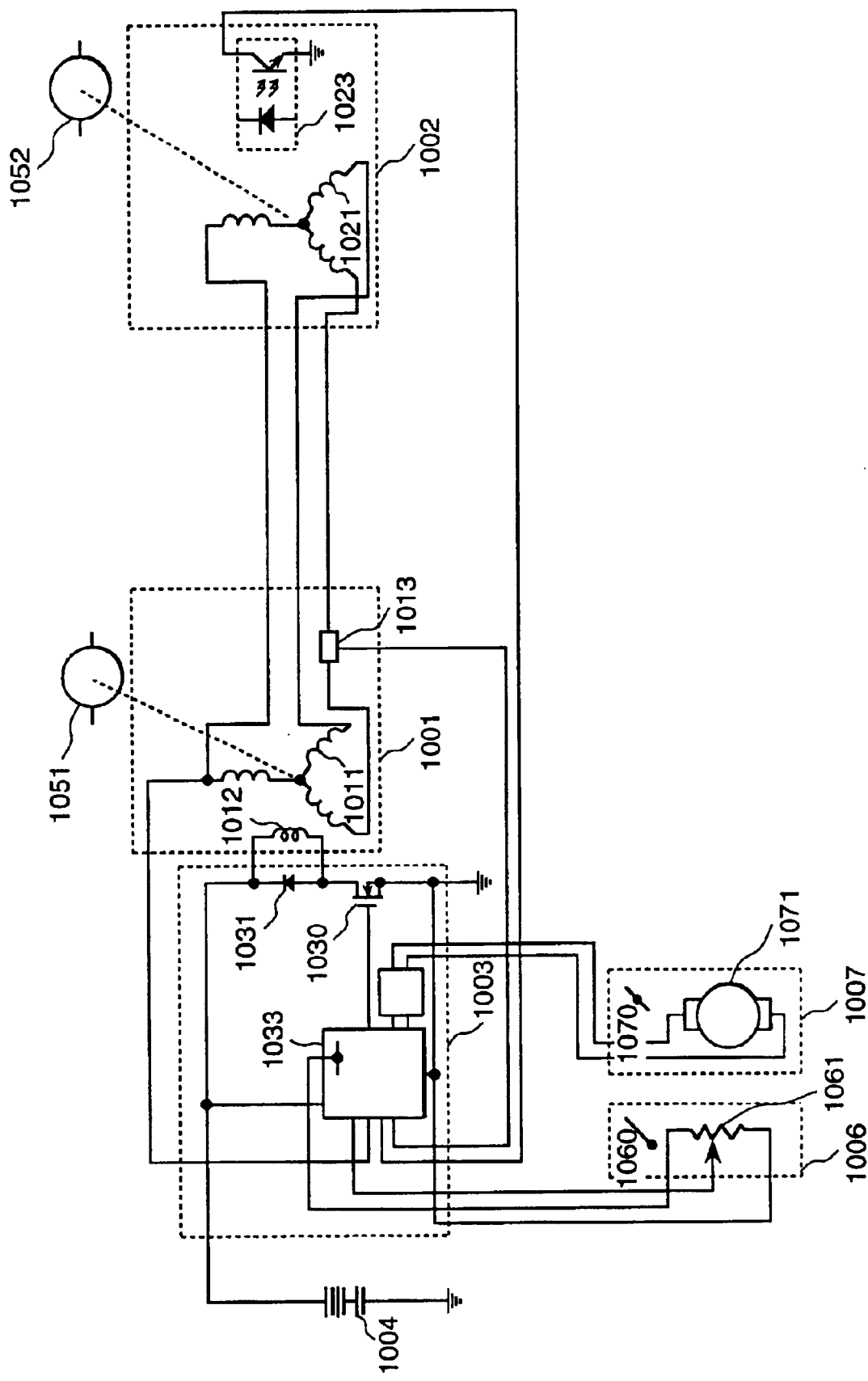
FIG. 10 is an electric circuit view showing the constitution of the vehicle driving apparatus according to a second embodiment of the present invention.

The second embodiment of the present invention will be described below with reference to FIGS. 10 to 14. The present embodiment is an improvement in the first embodiment, in which as the motor for driving the rear wheels, an induction motor is used. In the following description, only part different from the first embodiment will be described. FIG. 10 shows the constitution of part of an electric system of an automobile. Reference numeral 1001 denotes a generator (similar to the second generator 44 in the first embodiment), which comprises a 3-phase armature winding 1011, a field winding 1012 for supplying magnetic flux to the armature winding 1011, and an a current detector 1013. Numeral 1002 denotes an induction motor which comprises an armature winding 1021 for inputting a 3-phase AC current from the armature winding 1011, and a rotation detector 1023. The rotation detector 1023 outputs a pulse according to rotation of the motor 1002. Numeral 1003 denotes a field current control device, which comprises a power MOS 1030, a flywheel diode 1031, a H bridge circuit 1032, and a control circuit 1033. Numeral 1004 denotes a battery, 1006 denotes an accelerator device comprising an accelerator pedal 1060 and a variable resistor 1061 whose resistance is variable according to an accelerator opening-degree, and 1007 denotes a throttle actuator comprising a valve 1070 and a DC motor 1071 to control a fuel supply amount of a prime mover.

The present embodiment is provided with a generator similar to the first generator 4 in the first embodiment, which drawing and explanation are omitted here.

Figure 11:
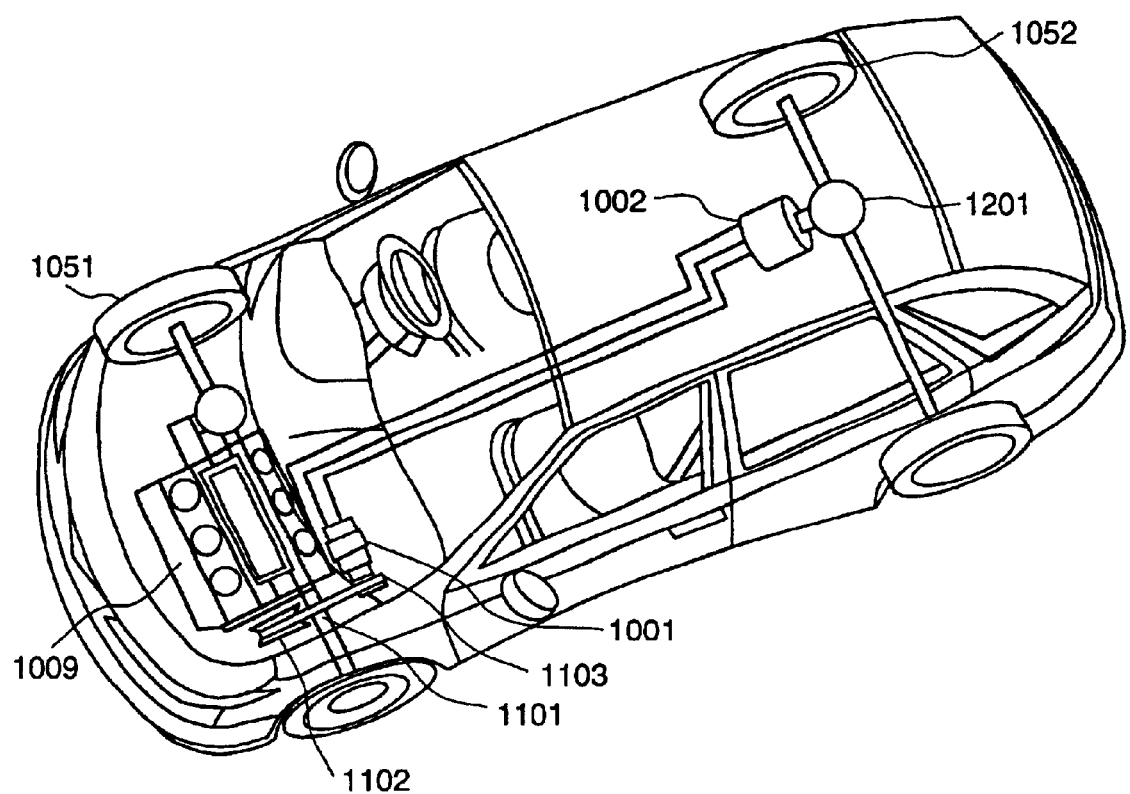
FIG. 11 is a view showing a mechanical positional relationship between parts in FIG. 1.

FIG. 11 shows a mechanical positional relationship of parts in FIG. 10. Reference numerals representative of the same parts as those of FIG. 10 is underlined. Numeral 1009 denotes a prime mover, and a front wheel 1051 is driven by the prime mover 1009. The rotating force of the prime mover 1009 is transmitted to the generator 1001 through a crank pulley 1102, a belt 1101, and a pulley 1103. The induction motor 1002 drives rear wheels 1052 through a differential gear 1201. The generator 1001 is electrically connected to the induction motor 1002 through three wires.

Figure 12:
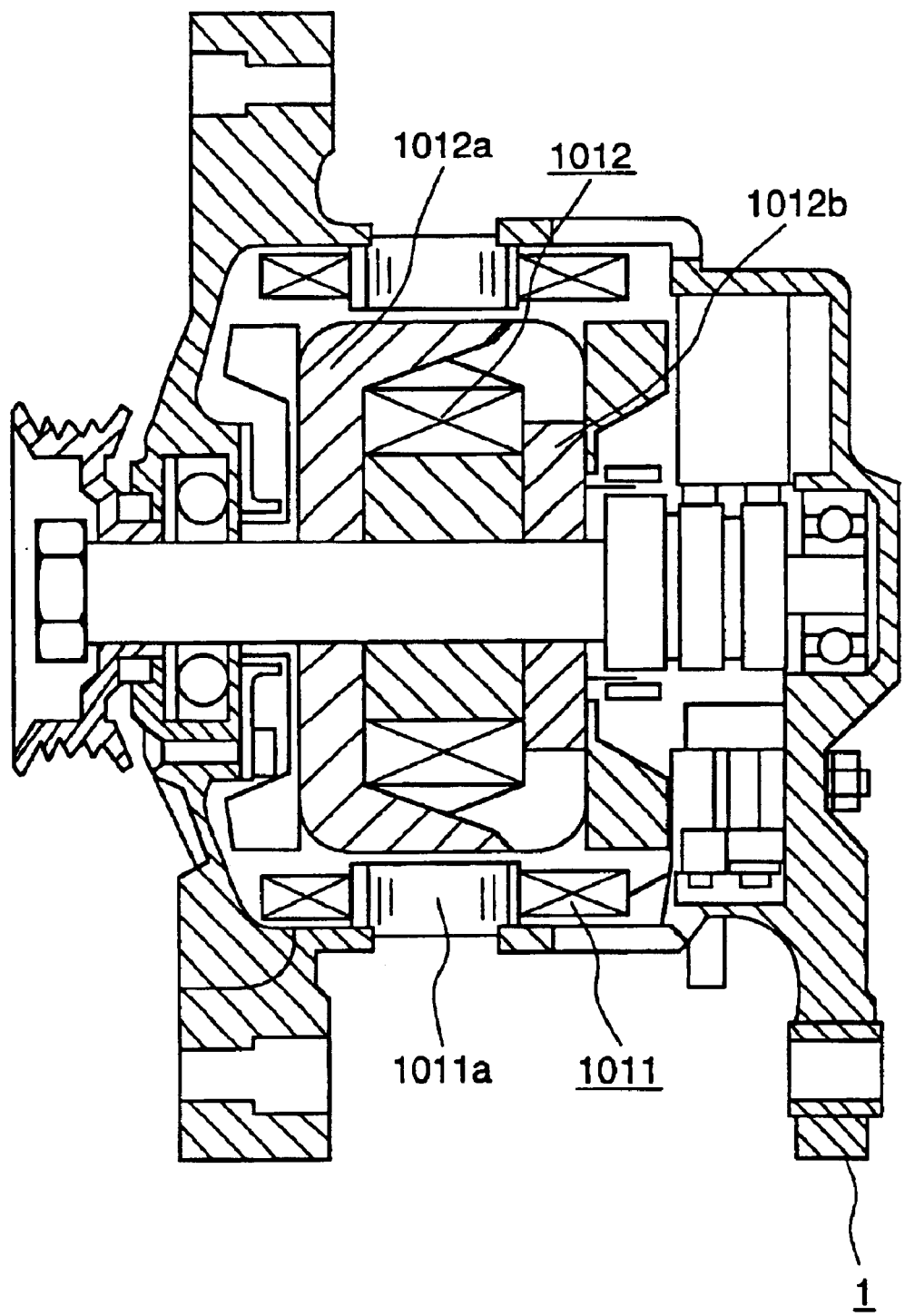
FIG. 12 is a sectional view showing the constitution of a generator used in the vehicle driving apparatus according to the second embodiment of the present invention.
Figure 13:
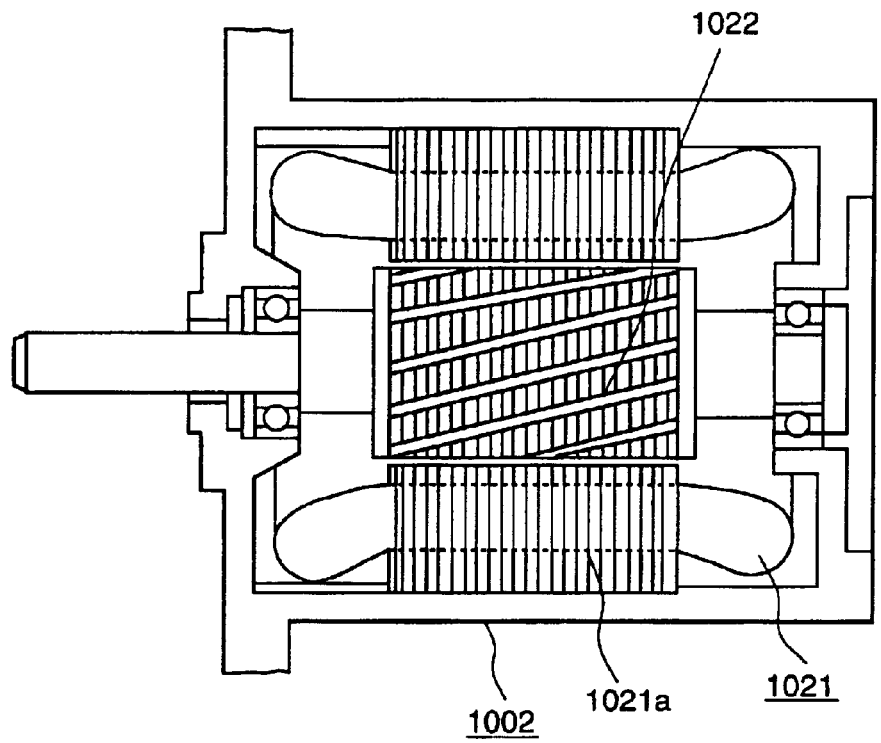
FIG. 13 is a sectional view showing the constitution of an induction motor used in the vehicle driving apparatus according to the second embodiment of the present invention.

FIG. 12 shows the constitution of the generator in FIG. 10, and FIG. 13 shows the constitution of the induction motor in FIG. 10. Reference numerals representative of the same parts as those in FIG. 10 is underlined. Numeral 1011*a* denotes a stator for supplying magnetic flux to the armature winding 1011, and 1012*a* and 1012*b* denote rotors by which the field winding 012 is excited. Numeral 1021*a* denotes a stator for supplying magnetic flux to the armature winding 1021, and 1022 denotes a rotor comprised of a cage-shaped conductor.

The operation of the circuit in FIG. 10 will be described below. First, the power MOS 1030 in FIG. 10 control a current which flows through the field winding 1012 from the battery 1004. A current flowing through the field winding 1012 increases in proportional to a duty cycle of the power MOS 1030.

Field current If is expressed by $$If = VB/Rf \cdot D \tag{1}$$

where:

VB: voltage (V) of battery 1004
Rf: resistance (Q) of field winding 1012
D: duty cycle of power MOS 1030

When the field current increases, magnetic flux crossing the armature winding 1011 increases, and voltage generated in the armature winding 1011 becomes high. Generation voltage is schematically expressed as follows:

$$VA = C \cdot Na \cdot If \cdot \sin(\omega a \cdot t) \tag{2}$$

$$\omega a = 2\pi (Na \cdot Pa)/60 \tag{3}$$

$$Na = Ne \cdot Pr \tag{4}$$

where:

VA: generation voltage (V) of generator 1001
C: constant
Na: rotational speed (/min) of generator 1001
ωa: angular velocity (rad/sec) of generator 1001
t: time (sec)
Pa: number of poles of generator 1001
Ne: rotational speed (/min) of prime mover 1009
Pr: pulley ratio between prime mover 1009 and generator 1001

On the other hand, the angular velocity ωm of the induction motor 1002 is expressed by:

$$\omega m = 2\pi (Nm \cdot Pm)/60 \tag{5}$$

$$Nm = Nr \cdot Gr \tag{6}$$

where:

ωm: angular velocity (rad/sec) of induction motor 1002
Nm: rotational speed (/min) of induction mover 1002
Pm: number of poles of induction motor 1002
Nr: rotational speed (/min) of rear wheels 1052
Gr: gear ratio of differential gear 1201

A relationship between rotational speed of the prime mover 1009 and rotational speed Nf of the front wheels 1051 is expressed by $$Ne \geq Nf \cdot Gf \tag{7}$$

where:

Nf: rotational speed (/min) of front wheels 1051
Gf: final reduction ratio between prime mover 1009 and front wheel 1051

Equation (7) represents that where a torque converter (not shown) is present between the prime mover 1009 and the axle of the front wheels 1051 and in the states other than the locked up state, the torque converter is slipped, and the rotational frequency of the prime mover 1009 is somewhat high.

From Equations (3), (4), (5), (6) and (7), the following is obtained:

$$\omega a/\omega m \geq (Nf \cdot Gf \cdot Pr \cdot Pa)/(Nr \cdot Gr \cdot Pm) \tag{8}$$

Suppose that the driving force of the prime mover 1009 for driving the front wheels is greater than that of the induction motor 1002 for driving the rear wheels, the front wheels are apt to slip, and the following relationship is obtained:

$$Nf \geq Nr \tag{9}$$

resulting in $$\omega a/\omega m \geq (Gf - Pr - Pa)/(Gr - Pm) \tag{10}$$

The condition that the induction motor 1002 generates a torque is that AC input is carried out at the frequency higher than the rotational frequency of the induction motor, which will suffice to fulfill with $$Gf \cdot Pr \cdot Pa \geq Gr \cdot Pm \tag{12}$$

which is obtained by substituting in Equation (10) the following $$\omega a/\omega m \geq 1 \tag{11}$$

As long as Equation (12) is fulfilled, the induction motor 1002 generates the rotating force, which force can be controlled by voltage of the generator 1001.

Figure 14:
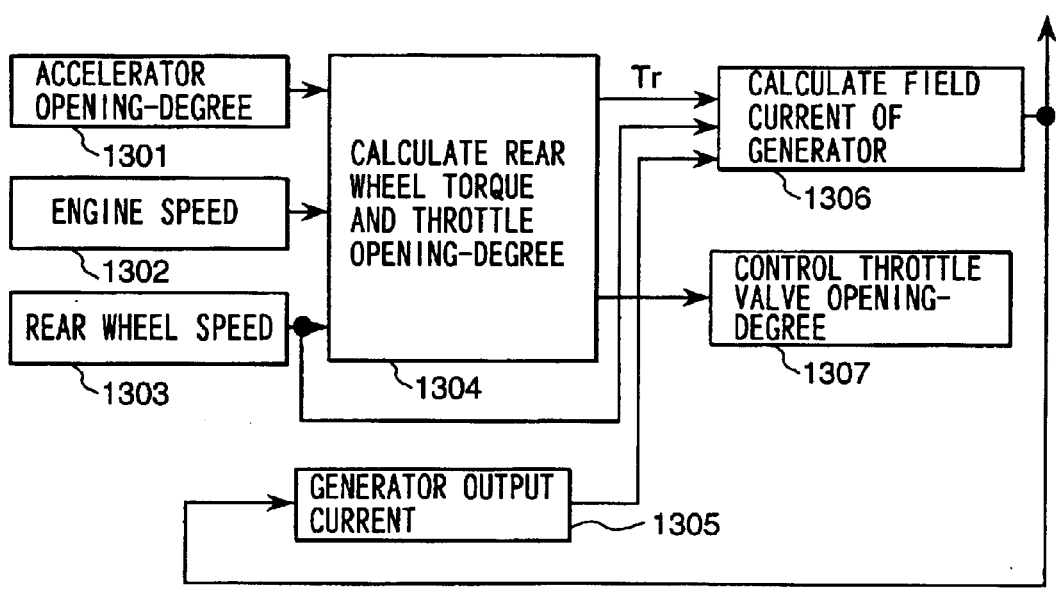
FIG. 14 is a block diagram for explaining operation of a control circuit used in the vehicle driving apparatus according to the second embodiment of the present invention.

FIG. 14 shows the operation of a control circuit 1033. An accelerator opening-degree is input in a block 1301 in FIG. 14, a rear wheel drive torque and a throttle opening-degree are calculated in the block 1304 from information on the rotational speed of the prime mover 1302 and the rear wheel rotational speed 1303. The torque demanded by an operator is distributed to the rear wheels in a range that the front wheels are not slipped. In the block 1305, an output current of the generator 1001 is detected, and a field current of the generator is controlled from a difference between the demanded value of the rear wheel drive torque and actual torque (which is obtained from the current of the generator 1001=the current of the induction motor 1002 and the rear wheel rotational speed). The control of the field current is carried out by adjusting the duty cycle of the power MOS1030 as described above. The value of the field current is $1/10$ or less as compared with that of current of the armature winding, and torque can be controlled easily without using a high power element.

According to the embodiment described above, the AC motor can be controlled without using a high power element such as an inverter, and the 4-wheel drive vehicle can be supplied inexpensively. Further, since the AC motor is used as an actuator for rear wheel drive, abrasive part such as a commutator of a DC motor need not be used, thus providing high durability.

(Third Embodiment)

Figure 15:
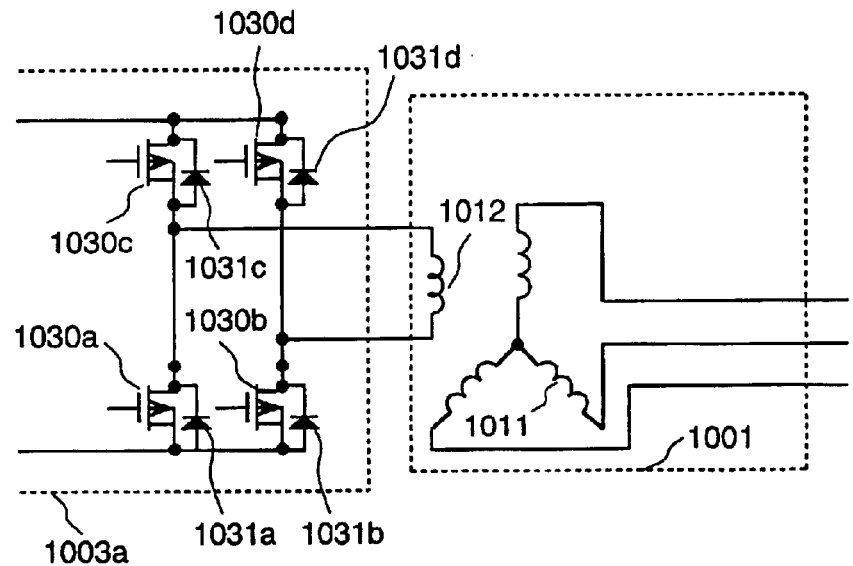
FIG. 15 is an electric circuit view showing part of the constitution of the vehicle driving apparatus according to a third embodiment of the present invention.

The third embodiment will be described below with reference to FIG. 15. The present embodiment is a modification of the second embodiment. In the following description, only part different from the second embodiment will be described. FIG. 15 shows the constitution of part of an electric system of an automobile. FIG. 15 corresponds to part of the generator 1001 and the field current control device 1003 in FIG. 10, which comprises N-channel type power MOS 1030a, 1030b, P-channel type power MOS 1030c, 1030d, and diodes 1031a, 1031b, 1031c, 1031d.

In the FIG. 10 embodiment, the field winding 1012 is energized merely by the power MOS 1030, and a current flows only in one direction, but in the circuit of FIG. 15, when the power MOS 1030c and 1030b are energized, a current flows in a positive direction (the same direction as that of the circuit in FIG. 10), and when the power MOS 1030d and 1030a are energized, a current flows in a reverse direction (opposite to that of the circuit in FIG. 10). When a current flows to the field winding 1012 in a positive direction and when a current flows in a reverse direction, a phase of C voltage generated in the armature winding 1011 is inverted, and the rotating direction of the induction motor 1002 can be changed.

Since in the present embodiment, rotation of the rear wheels can be made in the reverse direction, even when the automobile is intended to move back, the effect of the 4-wheel drive can be obtained. For example, since at the time of reverse on snow road, idle-running of the front wheels can be prevented, it is possible to enhance the stability of the vehicle.

(Fourth Embodiment)

Figure 16:
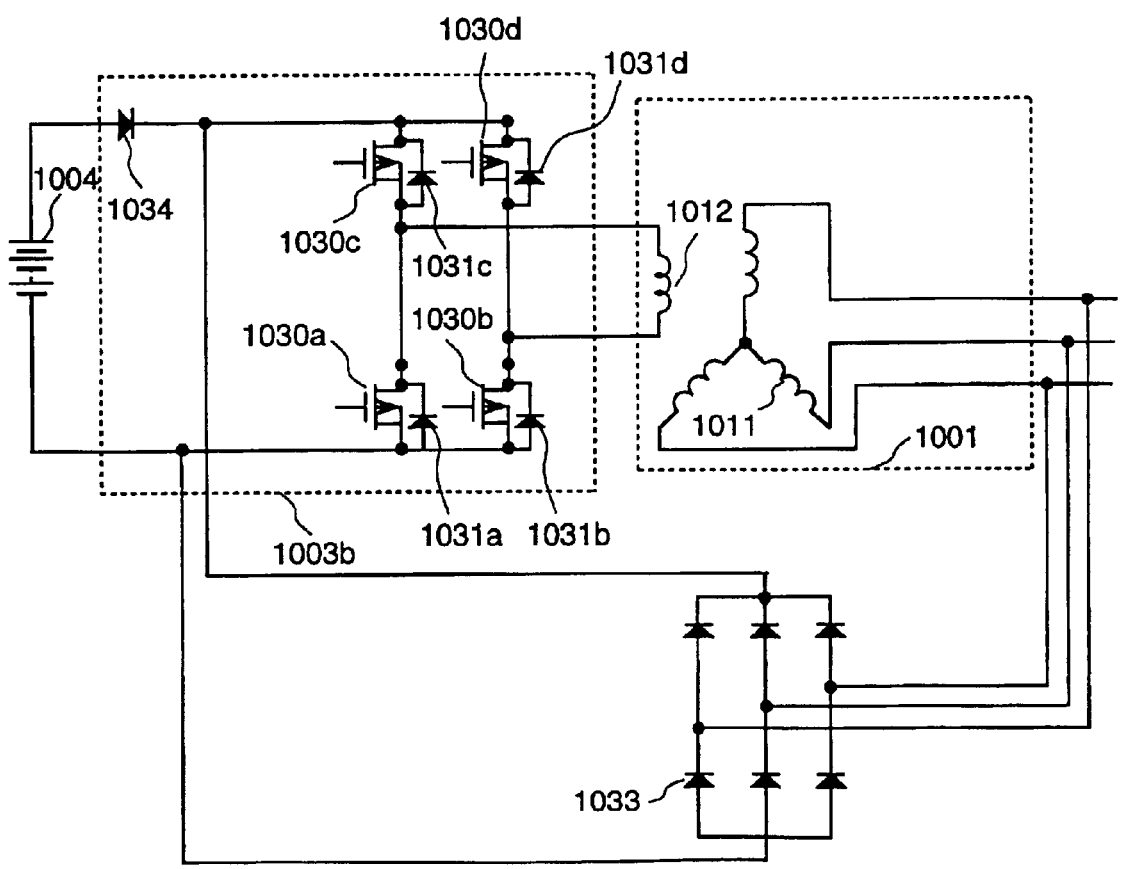
FIG. 16 is an electric circuit view showing part of the constitution of the vehicle driving apparatus according to a fourth embodiment of the present invention.

The fourth embodiment of the present invention will be described with reference to FIG. 16. The present embodiment is a modification of the third embodiment. In the following description, only part different from the third embodiment will be described. FIG. 16 shows the constitution of part of an electric system of an automobile. In FIG. 16, a diode bridge 1033 and a diode 1034 are added to the embodiment of FIG. 15. According to the circuit of FIG. 16, out of a DC generation output of an armature winding 1011 of the generator 1001 and the battery 1004, a higher voltage is applied to a field winding 1012. In this circuit, when the generation voltage becomes high, the voltage applied to the field winding 1012 also becomes high and the generation voltage further becomes high to take out higher power.

According to the present embodiment, since the torque transmitted to the rear wheel can be made high, the safety is further enhanced.

What is claimed is:

1. In a driving apparatus for a four-wheel drive vehicle having first and second driving axles and a drive system that includes an internal combustion engine which drives said first driving axle and is coupled to a generator that supplies power to a battery, said second driving axle being driven by a motor force; electric driving apparatus comprising:

a second generator driven by said internal combustion engine;

a motor for generating said motor force; and a control unit for controlling a drive of said second generator and a drive of said motor, wherein said second generator supplies power exclusively for driving said motor;

said second generator has a power output that is higher than a power output of said first generator;

said second generator is arranged in an engine compartment, together with said internal combustion engine and said first generator;

said second generator is arranged at a side of said internal combustion engine together with said first generator, and at a position which is below said first generator;

said motor uses electric power generated by said second generator to generate said motor force;

said motor is arranged at a bottom portion of said vehicle, in a vicinity of a differential gear having a reduction mechanism for transmitting a driving force to said second driving axle;

said motor is connected mechanically to said differential gear via a clutch.

2. The driving apparatus for a four-wheel drive vehicle according to claim 1, wherein:

said control unit is provided in a wiring path intermediate a magnetic field power supply of said second generator and said second generator; and said control unit is arranged in an inner portion of said engine room.

3. The driving apparatus for a four-wheel drive vehicle according to claim 1, wherein said control unit is contained in another control means for controlling ancillary electrical equipment of said vehicle.

4. The driving apparatus for a four-wheel drive vehicle according to claim 1, wherein said second generator is a closed type generator that cools a cooling medium for an internal combustion engine cooling by circulating said cooling medium in said internal combustion engine.

5. The driving apparatus for a four-wheel drive vehicle according to claim 4, wherein:

said control unit is provided in a wiring path intermediate a magnetic field power supply of said second generator and said second generator; and said control unit is arranged in an inner portion of said engine room.

6. The driving apparatus for a four-wheel drive vehicle according to claim 4, wherein said control unit is contained in another control means for controlling ancillary electrical equipment of said vehicle.

* * * * *

UNITED STATES PATENT AND TRADEMARK OFFICE
CERTIFICATE OF CORRECTION

PATENT NO. : 6,965,173 B2 Page 1 of 1
APPLICATION NO. : 09/793424
DATED : November 15, 2005
INVENTOR(S) : Yoshinori Fukasaku et al.

It is certified that error appears in the above-identified patent and that said Letters Patent is hereby corrected as shown below:

On Title Page Item (73) should read

(73) Assignee: Hitachi, Ltd., Tokyo (JP)
              Nissan Motor Co., Ltd., Kanagawa-ken (JP)

Signed and Sealed this

Ninth Day of February, 2010

David J. Kappos
*Director of the United States Patent and Trademark Office*